United States Patent [19]

Dietrich et al.

[11] Patent Number: 5,141,968
[45] Date of Patent: Aug. 25, 1992

[54] POLYETHER POLYOLS BASED ON AROMATIC DIAMINES AND POLYAMINES, A PROCESS FOR THEIR PREPARATION, AND THEIR USE FOR POLYURETHANE AND POLYISOCYANURATE PLASTICS

[75] Inventors: Manfred Dietrich, Leverkusen, Fed. Rep. of Germany; Reinhard Kaufung, Amagasaki, Japan

[73] Assignee: Bayer Aktiengesellschaft, Leverkusen, Fed. Rep. of Germany

[21] Appl. No.: 394,046

[22] Filed: Aug. 15, 1989

[30] Foreign Application Priority Data

Aug. 30, 1988 [DE] Fed. Rep. of Germany ....... 3829290

[51] Int. Cl.$^5$ ............................................ C08G 18/14
[52] U.S. Cl. .................................... 521/167; 564/399; 564/443
[58] Field of Search ................ 564/399, 443; 521/167; 528/421

[56] References Cited

U.S. PATENT DOCUMENTS

| | | | |
|---|---|---|---|
| 3,499,009 | 3/1970 | Odiad et al. | 260/570 |
| 4,209,609 | 6/1980 | Haas | 528/421 |
| 4,243,759 | 1/1981 | Haas | 521/167 |
| 4,391,728 | 7/1983 | Korczak et al. | 252/182 |
| 4,421,871 | 12/1983 | Korczak et al. | 521/167 |
| 4,469,822 | 9/1984 | Stolz et al. | 521/167 |
| 4,562,290 | 12/1985 | Korczak et al. | 564/399 |
| 4,587,058 | 5/1986 | Knofel et al. | 560/347 |
| 4,613,687 | 9/1986 | Knofel et al. | 560/359 |
| 4,614,754 | 9/1986 | Christman | 521/167 |
| 4,761,498 | 8/1988 | Knofel et al. | 560/359 |
| 4,902,834 | 2/1990 | Otten et al. | 568/608 |
| 4,945,619 | 8/1990 | Bayer | 29/33 R |

FOREIGN PATENT DOCUMENTS

| | | |
|---|---|---|
| 239891 | 10/1987 | European Pat. Off. |
| 972772 | 10/1964 | United Kingdom |
| 1311095 | 3/1973 | United Kingdom |

OTHER PUBLICATIONS

JP 58134108 Abstract Only.

*Primary Examiner*—John Kight, III
*Assistant Examiner*—Shelley A. Wright
*Attorney, Agent, or Firm*—Joseph C. Gil; Richard E. L. Henderson; Godfried R. Akorli

[57] ABSTRACT

The present invention relates to polyether polyols having OH numbers of about 300 to 630 obtained by sequentially reacting 2,4- and/or 2,6-tolylenediamine or mixtures of 2,4-and/or 2,6-tolylenediamine and one or more other aromatic amines with from about 1 to 2.5 moles of ethylene oxide for each $NH_2$ group, and then with from about 0.5 to 5 moles of propylene oxide for each $NH_2$ group, wherein said polyether polyols contain secondary amino groups comprising from about 2 to 20% of the isocyanate-reactive groups in said polyols and a free aromatic amine content of less than about 0.2% by weight. The present invention further relates to a process for preparing the polyether polyols of the invention, as well as to a method of using the polyether polyols for the preparation of polyurethane plastics.

1 Claim, No Drawings

POLYETHER POLYOLS BASED ON AROMATIC DIAMINES AND POLYAMINES, A PROCESS FOR THEIR PREPARATION, AND THEIR USE FOR POLYURETHANE AND POLYISOCYANURATE PLASTICS

BACKGROUND OF THE INVENTION

This invention relates to improved basic polyether polyols, to a process for their preparation, and to their use for the preparation of polyurethane and polyisocyanurate plastics.

Alkylene oxide adducts of tolylene diamines ("TDA"), in particular of 2,4- and 2,6-TDA and mixtures thereof, and their use for the preparation of polyurethanes has long been known (British Patent 972,772). Polyethers based n o-TDA and their use for the preparation of polyurethanes are also disclosed in German Offenlegungsschrift 2,017,038. Alkylene oxide adducts of aniline-formaldehyde condensation products ("MDA") are described in U.S. Pat. No. 3,499,009. In these polyethers, all amine protons of the aromatic amines react with epoxides.

TDA is manufactured in large quantities as a starting material for the preparation of tolylene diisocyanate ("TDI"). Due to its ready accessibility, crude TDA, which contains small quantities of o-components in addition to the 2,4-and 2,6-isomers, has always been an attractive candidate as starting material for rigid foam polyethers. In the manufacture of TDA, it has become customary to purify crude TDA by distillation, a process in which o-TDA (a mixture of 2,3- and 3,4-TDA with up to 15% by weight of impurities such as diaminocyclohexane, hexahydrotolylenediamine, aniline, toluidine, and the like) is obtained as by-product. This inexpensive by-product is increasingly being used, both in the directly obtained crude form and as a purified form, as starting material for basic polyethers.

Work in this field has intensified following reports (e.g., U.S. Pat. No. 4,209,609, believed to be equivalent to EP 001,800) that rigid polyurethane foams based on TDA polyethers have important advantages over conventional rigid polyurethane foams if the OH number ranges from about 400 to about 630 and if such foams have been prepared by first reacting TDA with approximately 4 moles of ethylene oxide and then with propylene oxide. That is, in addition to the end product having a high OH number and a minimum proportion of ethylene oxide, almost all of the end groups must be secondary. Particular advantages of these products include an extremely low coefficient of thermal conductivity, high flame resistance, and excellent toughness.

Pure propylene oxide polyethers prepared by conventional processes are very highly viscous in the above-mentioned range of OH numbers (e.g., greater than 50,000 mPa.s at 25° C.) and give rise to rigid foams having only ordinary levels of properties. Such ordinary properties are also found for relatively low viscosity pure propylene oxide polyethers, such as those prepared according to U.S. Pat. Nos. 4,391,728 and 4,421,871 in the presence of at least 0.8% alkali metal hydroxide at high temperatures. Pure ethylene oxide polyethers, on the other hand, are too reactive for most applications of rigid foams because of their primary hydroxyl groups.

Suitable polyethers which satisfy the above-mentioned requirements by containing about 4 moles of ethylene oxide per mole of TDI as well as propylene oxide, are described in U.S. Pat. No. 4,209,609. According to this patent, the alkoxylation catalyst is preferably added after the ethylene oxide stage. If, however, one of the above-mentioned amine catalysts (such as triethylamine or pyridine) is used before the addition of the ethylene oxide, highly viscous products containing exclusively tertiary amino groups are obtained. When potassium hydroxide is used directly, very low viscosity products are obtained but the results are not reproducible (see German Offenlegungsschrift 2,017,038, page 5, line 17) and the products contain very high proportions of free TDA (1 to 2% by weight).

The preparation by a two-stage process of low viscosity polyethers based on o-TDA within the OH number range of from 300 to 500 is described in U.S. Pat. No. 4,562,290. In this process, 1 to 3 moles of ethylene oxide per mole of o-TDA are added in the first stage at 125° C. and, after the addition of potassium hydroxide as catalyst, propylene oxide is then added at a temperature of at least 140° C.

The polyethers based on TDA prepared as described in U.S. Pat. No. 4,209,609 have only limited applications. Such polyethers cannot be used for the manufacture of rigid foam boards with thicknesses greater than 10 cm, although such boards are increasingly required by building regulations in many countries and can be produced on conventional laminators. Although, as already mentioned, such polyethers give rise to foams with low coefficients of thermal conductivity, high flame resistance, and good toughness combined with good flow properties, the products have a strong tendency to form cracks and to discolor at the core, especially when made in thick layers.

It has now surprisingly been found that TDA and MDA polyethers having excellent foaming properties can be used to prepare products in thick layers without the above-mentioned disadvantages of crack formation and core discoloration and with desirable improvements in properties such as flame resistance, toughness, and, especially, coefficients of thermal conductivity even lower than those obtained by known methods. Such improvements are achieved if the TDA is a 2,4- and/or 2,6 tolylenediamine or a mixture thereof with o-tolylenediamine and the MDA consists of diphenylmethane di- and/or polyamines and/or methyldiphenylmethane di- and/or polyamines as described in EP 024,665, 046,556, and 046,917, and if the entire alkoxylation with ethylene oxide followed by propylene oxide is carried out in the presence of special amine catalysts as described below.

SUMMARY OF THE INVENTION

The present invention relates to polyether polyols having OH numbers of about 300 to about 630 (preferably from 400 to 560) comprising adducts obtained by sequentially reacting 2,4- and/or 2,6-tolylenediamine or mixtures of 2,4- and/or 2,6-tolylenediamine and one or more aromatic amines selected from o-tolylenediamine, diphenylmethane diamines or polyamines, and methyldiphenylmethane diamines or polyamines, with (a) from about 1 to about 2.5 moles (preferably from 1.55 to 2.0 moles) of ethylene oxide for each mole of $NH_2$ groups, and then with (b) from about 0.5 to about 5 moles (preferably from 0.5 to 3.0 moles) of propylene oxide for each mole of $NH_2$ groups, wherein said polyether polyols contain secondary amino groups comprising from about 2 to about 20% of the total quantity of isocyanate-reactive groups in said polyols and have a free aromatic amine content of less than about 0.2% by weight of said polyols.

The invention further relates to a process for the preparation of the polyether polyols of the invention comprising reacting, in the presence of a foam catalyst (preferably N,N,N',N'-tetramethylguanidine, N-methylimidazole, benzyltrimethylammonium hydroxide and corresponding homologs, or 2-dialkylaminoethanol containing $C_1$-$C_4$ alkyl groups) at temperatures of from about 90° to about 125° C., 2,4- and/or 2,6-tolylenediamine or a mixture of 2,4- and/or 2,6-tolylenediamine and one or more aromatic amines selected from o-tolylenediamine, diphenylmethane diamines or polyamines, and methyldiphenylmethane diamines or polyamines, with (a) from about 1 to about 2.5 moles of ethylene oxide for each mole of $NH_2$ groups, and then with (b) from about 0.5 to about 5 moles of propylene oxide for each mole of $NH_2$ groups, such that the total quantity of ethylene oxide and propylene oxide is about 2.5 to about 5 moles per mole of $NH_2$ groups, wherein said polyether polyols contain secondary amino groups comprising from about 2 to about 20% of the total quantity of isocyanate-reactive groups in said polyol and have a free aromatic amine content of less than about 0.2% by weight of said polyol.

The invention also relates to a method for the preparation of polyurethane plastics, preferably polyurethane foams and including polyisocyanurate foams, that are particularly distinguished by flame-resistant properties. The preparation of such polyurethane plastics comprises reacting organic polyiscoyanates with the polyether polyols of this invention and may optionally be carried out in the presence of other polyhydroxyl compounds (such as polyether or polyester polyols), low molecular-weight chain-lengthening or crosslinking agents, and water, and optionally also in the presence of conventional auxiliary agents and additives and catalysts (including trimerization catalysts), as well as flame-retardants that may or may not be chemically incorporated into the polyurethane plastic. The optional components are those conventionally used for the preparation of polyurethane foams by the polyisocyanate polyaddition process.

DESCRIPTION OF THE INVENTION

In the method of preparation according to the invention, a considerable proportion of the amino groups (about 4 to 40 mole-percent) is only monoalkoxylated, so that from about 2 to about 20% of the isocyanate-reactive groups are left in the end product as secondary amino groups. The unreacted amino groups account for the lower viscosity compared with the prior art products, in which all the amino groups are completely alkoxylated.

The quantity of secondary amino groups in the polyethers according to the invention may be calculated from the difference in OH numbers determined by the acetic anhydride method and the phthalic acid anhydride method. It is known that the acetic anhydride method is used to determine the sum of the OH groups and NH groups, whereas in the phthalic acid anhydride method only the OH groups are acylated.

Another consequence of the presence of secondary amino groups is the reduction in the quantity of tertiary amino groups, which catalyze side reactions at the high foaming temperatures that may occur when foaming excessively thick layers or products of high gross density. Such side reactions can cause the formation of cracks and discoloration at the center.

It has surprisingly been found that in spite of the amino groups being only partially alkoxylated, the polyethers according to the invention contain less than 0.2%, and in most cases even less than 0.1%, free TDA or MDA.

The process according to the invention has further advantages because (1) the neutralization step and recovery of alkali metal salts can be omitted, and (2) due to the relatively low reaction temperatures, epoxide side reactions (such as the formation of aldehyde, dioxane, and dioxolane) are avoided and hence problems of effluent air pollution and discoloration of the end products are also avoided.

Another advantage of the polyethers of the invention is the increased initial activity of the foaming mixture due to the presence of the reactive secondary amino groups, thereby enabling a saving in catalyst.

Up to about 50 mole-percent of co-initiators such as glycerol, trimethylolpropane, pentaerythritol, sorbitol, and sucrose, and diols such as ethylene glycol, diethylglycol, and propylene glycol, as well as ammonia, aliphatic amines, and alkanolamines may, of course, also be used in the preparation of the polyethers according to the invention. Mixtures of TDA and MDA may also be used.

The process is generally carried out by first introducing the reaction vessel TDA or MDA together with the catalyst (about 0.15 to about 4.6% by weight, based on the aromatic amine). Suitable catalysts include ordinary commercial amine polyurethane foam catalysts, such as N,N-dimethylbenzylamine, N,N-dimethylcyclohexylamine, pentamethyldiethylenetriamine, 2,2'-bis(dimethylamino)diethyl ether, N-methyl-N'-(dimethylaminoethyl)piperazine, and amines selected from N,N,N',N'-tetramethylguanidine, N-methylimidazole, benzyltrimethylammonium hydroxide and homologues thereof, and 2-dialkylaminoethanol containing $C_1$-$C_4$-alkyl groups. See also German Offenlegungsschriften 2,624,527, 2,624,528, 2,636,787, 1,720,633, U.S. Pat. No. 3,330,782, German Auslegeschrift 1,030,558, and German Offenlegungsschriften 1,804,361 and 2,618,280. The 1- to 2.5-fold molar quantity of ethylene oxide per mole of $NH_2$ is added at about 90°–125° C. over the course of about 2 to 6 hours. After a further reaction time of about 2 hours, the quantity of propylene oxide is required to obtain an OH number of from about 300 to about 630 is added. After a further 5 hours at about 125° C., alkylene oxide can be found only in traces, which are removed under vacuum. No further work-up is required.

The products according to the invention are eminently suitable starting materials for polyurethane products for which polyhydroxyl compound with high OH numbers are conventionally used, such as coatings, adhesives, duromers, sandwich materials, and so forth. However, the most important applications are for rigid polyurethane foams with various polyisocyanurate content.

Various components in addition to the polyethers of the invention are used for the preparation of polyurethanes, preferably rigid polyurethane foams. Reactive components include polyisocyanates, such as aliphatic, cycloaliphatic, araliphatic, heterocyclic, and, especially, aromatic di- and/or polyisocyanates such as those described e.g. by W. Siefken in *Justus Liebigs Annalen der Chemie*, 562, pages 75-136. Such polyisocyanates include, for example, those of the formula

in which
n is from 2 to about 4 (preferably 2), and
Q is an aliphatic hydrocarbon group having 2 to about 18 (preferably 6 to 12) carbon atoms, a cycloaliphatic hydrocarbon group having about 4 to about 20 (preferably 5 to 11) carbon atoms, an aromatic hydrocarbon group having 6 to about 20 (preferably 6 to 13) carbon atoms, or an araliphatic hydrocarbon group having about 8 to about 15 (preferably 8 to 13) carbon atoms.

Examples of such polyisocyanates include the polyisocyanates described in German Auslegeschrift 2,832,253, pages 10-11. Commercially available polyisocyanates are particularly preferred, for example 2,4- and/or 2,6-tolylene diisocyanate and any mixtures of these isomers ("TDI"); diphenylmethane diisocyanates (4,4'- and/or 2,4'- and/or 2,2'-isomers); polyphenyl-polymethylene polyisocyanates obtained by aniline-formaldehyde condensation followed by phosgenation ("crude MDI"); and "modified polyisocyanates" containing, for example, carbodiimide groups, urethane groups, allophanate groups, isocyanurate groups, urea groups, and/or biuret groups, especially those modified polyisocyanates which are derived from 2,4- and/or 2,6-tolylene diisocyanate and more preferably those derived from 4,4'- and/or 2,4'-diphenylmethane diisocyanate. If only difunctional relatively high molecular weight compounds are used, and if the only chain lengthening agents used (if such agents are used at all) are difunctional low molecular weight compounds, then the preferred modified polyisocyanates have a functionality greater than two (that is, trifunctional and/or higher functionality polyisocyanates).

Optional starting materials for the preparation of polyurethanes include so-called chain lengthening agents or cross-linking agents, compounds which contain at least two isocyanate-reactive hydrogen atoms and have a molecular weight of from 18 to 399. Such compounds preferably contain one or more hydroxy, amino, thiol, carboxyl, or hydrazide groups, especially hydroxyl groups and/or amino groups, and serve as chain lengthening agents or cross-linking agents. These compounds generally have from 2 to 8 preferably 2 to 4) isocyanate-reactive hydrogen atoms. Example are described in German Auslegeschrift 2,832,253, pages 19-20, and include water, triethanolamine, ethylene glycol, diethylene glycol, trimethylolpropane, formitol mixtures, and glycerol.

Compounds containing at least two isocyanate-reactive hydrogen atoms and having molecular weights generally in the range of from about 200 to about 1500 may also be included as relatively high molecular weight co-polyol components in quantities of up to about 90% by weight, based on the quantity of polyethers of the invention. Suitable co-polyol components include polyesters and/or polyethers containing 2 to 8 hydroxyl groups of the type known for the preparation of homogeneous and cellular polyurethanes and described, for example, in German Auslegeschrift 2,832,253, pages 11-18. Preferred polyethers are of the type obtained by the addition of one or more alkylene oxides (ethylene oxide and especially propylene oxide) to divalent or higher valent "starters" such as propylene glycol, glycerol, sorbitol, formose, saccharose, triethanolamine, trimethylolpropane.

Suitable hydroxyl group-containing polyesters include the reaction products of polyhydric (preferably dihydric) alcohols, optionally also including trihydric alcohols, and polybasic (preferably dibasic) carboxylic acids. Instead of the free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic, or heterocyclic and may be substituted (for example, with halogen atoms) or unsaturated. Suitable carboxylic acids and derivatives thereof include succinic acid, adipic acid, suberic acid, azelaic acid, sebacic acid, phthalic acid, isophthalic acid, trimetllitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimerized and trimerized unsaturated fatty acids optionally mixed with monomeric unsaturated fatty acids such as oleic acid, dimethylterephthalate, and bis-glycol terephthalate. Suitable polyhydric alcohols include ethylene glycol, 1,2- and 1,3-propylene glycol, 1,4- and 2,3-butylene glycol, 1,6-hexanediol, 1,8-octanediol, neopentyl glycol, 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol and sorbitol, formitol, methyl glycide, diethylene glycol, triethylene glycol, tetraethylene glycol and higher polyethylene glycols, dipropylene glycol and higher polypropylene glycols, and dibutylene glycol and higher polybutylene glycols. The polyesters may contain a proportion of carboxyl end groups. Polyesters of lactones such as $\epsilon$-caprolactone or if hydroxycarboxylic acids such as $\omega$-hydroxycaproic acid may also be used.

Auxiliary agents and additives may also be used, including readily volatile inorganic or, preferably, organic substances used as blowing agents; known catalysts, such as tertiary amines and tin(II) and tin(IV) compounds; surface-active additives, such as emulsifiers and foam stabilizers; reaction retarders, for example, various acidic substances such as hydrochloric acid and organic acid halides; known cell regulators, such as paraffins, fatty alcohols, and dimethylpolysiloxanes; known pigments and dyes; stabilizers against aging, light, and weathering; plasticizers; fungistatic and bacteriostatic substances; and fillers. These optional auxiliary agents and additives are described in some detail, for example, in German Auslegeschrift 2,732,292, pages 21-24. Further examples of auxiliary agents and additives are described in Kunststoffhandbuch, Volume VII, published by Vieweg and Höchtlen, Carl-Hanser-Verlag, Munich 1966, for example, on pages 103-113, and in Kunststoffhandbuch, Volume VII, published by Becker and Braun, Carl-Hanser-Verlag, Munich 1983, on pages 92-111.

Rigid foams produced from the polyethers of this invention are used as insulating boards, sandwich elements with various facings, in situ foams such as injection molded foams or foams produced by the coating process, sunlight collector fillings, pipe insulations, filling and assembly foams, and block foams.

Rigid foams can be produced by the conventional continuous or batchwise processes used for processing polyurethanes, including the laminator technique, injection molding or casting processes, and processes using high pressure or low pressure foaming machines in which the relatively low viscosities afford advantages, especially for mechanical processing.

The following examples further illustrate details for the preparation of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

DESCRIPTION OF THE PREFERRED EMBODIMENTS

Examples 1 to 14a and Comparison Examples a to c

General Method of Preparation

The aromatic amine and the catalyst are introduced with stirring under a nitrogen atmosphere into a reactor suitable for reactions with alkylene oxides. The ethylene oxide is added under a nitrogen pressure of 1–3 bars at 90°–125° C. and the reaction is continued for a further 1–2 hours. The propylene oxide is gradually added at the above temperature, followed by an after-reaction of about 5 hours. Any residual traces of free alkylene oxide are then removed by distillation under reduced pressure. About 0.1% by weight of 2,6-di-tert-butyl-4-methylphenol (available from Shell as Ionol) are added and the contents of the reactor are discharged.

Fifteen formulations, the resulting polyether polyols according to the invention, and three Comparison Examples are entered as examples in Table 1 below. The abbreviations used in Table 1 have the following meanings:

EO: Ethylene oxide given in moles per mole of tolylenediamine ("TDA")
PO: Propylene oxide given in moles per mole of tolylenediamine
m-TDA: Mixtures of 2,4- and 2,6-TDA in a weight ratio of 80:20
o-TDA: Mixture of 2,3- and 3,4-TDA
o-TDA$^x$: o-TDA containing about 10% of impurities such as diaminocyclohexane, hexahydrotolylenediamine, and the like
MDA 70: Condensation product of aniline and formaldehyde, 70% diphenylmethane diamine, and 30% polyamine
Methyl MDA: Diaminoethyl diphenylamine EO (1.8 mole per mole of NH$_2$) was first used for the polyethers started on MDA, and PO was then added until the required OH number was obtained.

The product c, which is the comparison to Example 12 (essentially identical composition except for the catalyst used), was prepared according to the U.S. Pat. No. 3,499,009.

Catalysts

1: N-methylimidazole
2: benzyltrimethylammonium hydroxide as a 40% aqueous or methanolic solution
3: 2-di(methylamino)ethanol
4: 2-di(butylamino)ethanol
5: N,N-dimethylbenzylamine
6: N,N-dimethylcyclohexylamine
7: pentamethyldiethylenetriamine
8: 2,2'-bis(dimethylamino)diethyl ether
9: N-methyl-N'-(dimethylaminoethyl)piperazine
10: potassium hydroxide
11: triethylamine
12: pyridine
13: tetramethylguanidine The quantity of catalysts given in by weight in Table 1 is based on the total reaction mixture. In Comparison Examples a, b and c, the catalysts was added only after the ethylene oxide stage.

Polyether polyols which were catalyzed with potassium hydroxide solution were neutralized with sulfuric acid after completing the after-reaction and the salts were filtered off during the work-up.

The OH number given were determined both by the acetic acid anhydride ("Ac$_2$O") method and by the phthalic anhydride ("PSA") method. The difference in the values between the two methods gives the secondary NH group content.

TABLE 1

| | Starter (ratio by weight) | Catalyst | % by weight | Moles EO | Catalyst | % by weight | Moles PO | OH number (Ac$_2$O) | OH number (PSA) | $\eta 25°$ (mPa·s) | TDA % by weight |
|---|---|---|---|---|---|---|---|---|---|---|---|
| 1 | m-TDA | 1 | 0.25 | 3.6 | | | 3.4 | 470 | 425 | 7,980 | 0.04 |
| a | m-TDA | | | 3.6 | 10 | 0.3 | 3.4 | 468 | 467 | 18,600 | 0.002 |
| 2 | m-TDA/o-TDA (9:1) | 3 | 0.3 | 3.6 | | | 3.4 | 469 | 435 | 8,090 | 0.05 |
| 3 | m-TDA/o-TDA (7:3) | 2 | 0.2 | 3.6 | | | 3.4 | 469 | 448 | 8,800 | 0.06 |
| 4 | m-TDA/o-TDA (1:1) | 1 | 0.15 | 3.6 | | | 3.4 | 471 | 433 | 7,360 | 0.04 |
| b | m-TDA/o-TDA (1:1) | | | 3.6 | 10 | 0.3 | 3.4 | 472 | 468 | 18,900 | 0.003 |
| 5 | m-TDA/o-TDA (3:7) | 7 | 0.2 | 3.6 | | | 3.4 | 468 | 432 | 6,590 | 0.05 |
| 6 | m-TDA/o-TDA (1:9) | 1 | 0.1 | 3.6 | | | 3.4 | 469 | 428 | 9,020 | 0.03 |
| 7 | m-TDA/o-TDA$^x$ (1:9) | 1 | 0.1 | 3.6 | | | 3.4 | 464 | 426 | 8,050 | 0.03 |
| 8 | m-TDA | 3 | 0.5 | 3.6 | | | 2.33 | 539 | 510 | 9,650 | 0.09 |
| 9 | m-TDA | 1 | 0.3 | 3.6 | | | 4.8 | 401 | 380 | 4,490 | 0.04 |
| 10 | m-TDA | 1 | 0.3 | 3.6 | | | 5.9 | 360 | 340 | 3,100 | 0.03 |
| 11 | m-TDA | 13 | 0.4 | 3.6 | | | 3.4 | 468 | 430 | 8,350 | 0.04 |
| 12 | MDA 70 | 5 | 0.5 | | | | | 470 | 425 | 58,520 | |
| c | MDA 70 | | | | 10 | 0.3 | | 468 | 462 | 2,013,000 | |
| 13 | MDA 70 | 1 | 0.5 | | | | | 420 | 375 | 11,680 | |
| 14 | Methyl-MDA | 4 | 0.5 | | | | | 470 | 442 | 29,750 | |
| 14a | m-TDA/MDA 70 (1:1) | 1 | 0.4 | | | | | 470 | 430 | 25,000 | |

Examples 15-22

Practical Application

In the following Tables, formulations for the preparation of rigid polyurethane foams or polyurethane/urea foams and rigid polyisocyanurate-containing foams from selected polyols according to the invention are given by way of example.

The isocyanates starting materials were commercial polyphenylpolymethylene polyisocyanates obtainable by the phosgenation of aniline-formaldehyde condensates and having isocyanate contents of from 30–32% by weight (Desmodur 44 V 20, Desmodur 44 V 40, and Desmodur 44 V 70 of Bayer AG).

EXAMPLE 15

Rigid polyurethane foams were prepared from the polyols according to the invention described in Examples A to E (Table 2), using the following formulation:

| | |
|---|---|
| 70% by weight | polyol mixture I (see below) |
| 30% by weight | m-TDA—EO—PO |
| 1.4% by weight | dimethylcyclohexylamine |
| 40% by weight | trichlorofluoromethane ("R11") |
| 153% by weight | Desmodur 44 V 20 |
| Polyol mixture I | |
| 15% by weight | ethylenediamine-PO polyether (OH number 630) |
| 9% by weight | glycerol |
| 9% by weight | dimethyl N,N'-bis(hydroxypropyl)-aminomethylphosphonate |
| 20% by weight | dibromobutenediol-epichlorohydrin polyether (OH number 330; 32% Br, 6.8% Cl) |
| 15% by weight | tris(chloroethyl) phosphate |
| 1.4% by weight | stabilizer |
| 0.6% by weight | water |

The m-TDA-EO-PO polyethers according to the invention are intimately mixed with polyol mixture I, activator, and R11. The quantities of isocyanate shown in the Table 2 are added and the mixture is stirred for 6 to 12 seconds and then poured into an open mold.

Free foams measuring $30 \times 30 \times 30$ cm$^3$ and having a gross density of 25–30 kg/m$^3$ were obtained. Since curing of the foams was determined by a manual procedure, the results can only be compared on a relative basis.

The flame properties of the foams were tested according to DIN 4102.

TABLE 2

| | A | B | C | D | E |
|---|---|---|---|---|---|
| m-TDA polyether used from Example: | 1 | 8 | 9 | 10 | 11 |
| Relative curing of the foams prepared according to Example 15 | 1.30 | 1.32 | 1.30 | 1.43 | 1.35 |
| Fire behavior (DIN 4102; height of flame in mm) of the foams produced according to Example 15 | 127 | 130 | 120 | 120 | 130 |
| Formation of cracks in the foams produced according to Example 18 | no | no | no | no | no |

Example 16

Foams were prepared by the method of Example 15 from TDA polyols according to the invention, using o- and m-TDA as starters (Examples F to L in Table 3, using the polyols from Examples 2-7).

TABLE 3

| | F | G | H | I | K | L |
|---|---|---|---|---|---|---|
| m-TDA polyether used from Example: | 2 | 3 | 4 | 5 | 6 | 7 |
| Relative curing of the foams prepared according to Example 16 | 0.79 | 1.02 | 0.92 | 1.13 | 1.12 | 1.12 |
| Fire behavior (DIN 4102; height of flame in mm) of the foams produced according to Example 16 | 137 | 120 | 120 | 117 | 127 | 130 |
| Formation of cracks in the foams produced according to Example 19 | no | no | no | no | no | no |
| Swelling (in mm) of the foams produced according to Example 19.2 | 6 | 7 | 7.5 | 8 | 8.5 | 8.5 |

Example 17

Foams based on MDA and methyl-MDA polyethers were prepared (Examples M to O in Table 4, using the polyols from Examples 12-14) as representatives of other polyols prepared from aromatic di- and polyamines by the claimed process.

TABLE 4

| | M | N | O |
|---|---|---|---|
| MDA or methyl-MDA polyether used from Example: | 12 | 13 | 14 |
| Relative curing of the foams prepared according to Example 17 | 1.79 | 2.2 | 1.88 |
| Fire behavior (DIN 4102; height of flame in mm) of the foams produced according to Example 17 | 143 | 130 | 130 |

Example 18

Foams having a gross density of about 65 kg/m$^3$ were prepared by the method of Example 15 from the polyols of Examples 1, 8, 9, 10, and 11. In these foams, the R11 content was lowered from about 40 parts by weight to about 10 parts by weight and the activator content was reduced to 0.5 parts. The isocyanate used was Desmodur 44 V 70. The foams were cut open 18 to 24 hours after their preparation and tested for the formation of cracks. When the m-TDA-EO-PO polyethers according to the invention were used, no burning at the center or formation of cracks could be observed in any of the foams in the above-mentioned range of gross densities (see Table 2, Examples A to E).

Example 19

19.1. The polyols prepared from various o-/m-TDA starter mixtures (Examples 2-7) were used to make into foams with gross densities of 50-53 kg/m$^3$ in accordance with Example 18. No burning at the center or formation of cracks could be observed within the above-mentioned gross density range (see Table 3, Examples F to L). At still higher gross densities (up to about 60 kg/m$^3$), an increasing tendency for crack formation can be observed as the proportions of o-TDA in the starter are increased.

19.2. The polyols according to the invention are particularly suitable for the production of rigid foams where a short dwell time in the mold (e.g., the freezing and refrigeration industry) or a short dwell time in the laminator (e.g., production of sandwich elements) is required. For this purpose, the raw materials according to Example 16 were introduced into a mold measuring 35×35×10 cm. Foams having a gross density of 30 kg/m³ were removed from the mold after 8 minutes and swelling of the foams was determined after another hour. Short residence times in the mold could be achieved by using the polyols of the invention, and the least amount of swelling and hence most favorable residence times were obtained with increasing proportions of m-TDA in the starter.

Comparison Example d

Foams were produced according to Example 18 from m-TDA-EO-PO polyethers which had been catalyzed at the propylene end stage with metal hydroxides (polyol from Comparison Example a). When the foams in the above-mentioned gross density range were cut open, the formation of cracks was clearly visible.

Comparison Example e

Foams prepared according to Examples 19.1 and 2 from TDA polyethers, using o- and m-TDA as starters and with the addition of catalyst after the ethylene oxide stage (polyol from Comparison Example b) show particularly severe signs of cracking.

Example 20

Rigid polyurethane boards were produced in known manner in a conventional commercial laminator installation by mechanically mixing the components. The boards were tested for their flame properties and thermal conductivity and the burning at the center and formation of cracks were assessed (Table 5). Example P in Table 5 demonstrates the possibility of using a polyol according to the invention from the TDA series and Example Q in Table 5 represents a polyol according to the invention from the MDA series.

Comparison Example f m-TDA- and m-/o-TDA-EO-PO polyethers which are catalyzed after the ethylene oxide stage tend to cause cracks in foams of relatively great thickness.

Comparison Example g

MDA- and methyl-MDA-polyethers which were catalyzed after the ethylene oxide stage could not be worked up by the high pressure technique because of high viscosity, even when used as mixtures.

TABLE 5

|  | Example 20 | | Comparison Examples | |
|---|---|---|---|---|
|  | P | Q | f | g |
| Polyol from Example 1 | 27 | — | — | — |
| Polyol from Example 13 | — | 27 | — | — |
| Polyol from Comparison Example a | — | — | 27 | — |
| Polyol from Comparison Example c | — | — | — | 27 |
| Phthalic acid ester (OH number 425) | 22 | 22 | 22 | 22 |
| Glycerol | 10 | 10 | 10 | 10 |
| Ethylene diamine-PE (OH number 630) | 10 | 10 | 10 | 10 |
| Ixol B 251 (OH number 330) (Solvay, Belgium) | 19 | 19 | 19 | 19 |
| Tris(chloroethyl) phosphate | 12 | 12 | 12 | 12 |
| Stabilizer | 1 | 1 | 1 | * |
| Water | 0.5 | 0.5 | 0.5 | * |
| R11 | 33 | 33 | 33 | * |
| Dimethylcyclohexylamine | 0.6 | 0.6 | 0.6 | * |

TABLE 5-continued

|  | Example 20 | | Comparison Examples | |
|---|---|---|---|---|
|  | P | Q | f | g |
| Desmodur 44 V 40 | 153 | 150 | 153 | * |
| Cream time (sec) | 10 | 10 | 10 | * |
| Gel time (sec) | 47 | 47 | 48 | * |
| Gross density of board (kg/m³) | 32 | 33 | 32 | * |
| Thickness of board (mm) | 150 | 150 | 50 | * |
| Pressure resistance (mPa) | 0.13 | 0.11 | 0.12 | * |
| Thermal conductivity (flow method, 24° C.) (W/m.K) | 0.018 | 0.018 | 0.018 | * |
| Fire test (DIN 4102) | B2 | B2 | B2 | * |
| Burning at the center | no | no | no | * |
| Formation of cracks | no | no | yes | * |

*Viscosity at 25° C. greater than 14000 mPa · s. no longer processible.

Example 21

The use of the polyols of the invention for the preparation of foams containing a reduced proportion of R11 or containing blowing agents other than R11 (for example, R123 and R22 were used in this Example) may be carried out, for example, in accordance with the following formulations (Table 6):

TABLE 6

|  | P | S | T | U |
|---|---|---|---|---|
| Polyol from Example 9 (OH number 380) | — | 29 | — | — |
| Polyol from Example 1 (OH number 470) | 29 | — | 29 | 29 |
| Thermal conductivity | 0.018 | 0.019 | 0.022 | 0.020 |
| Phthalic acid ester (OH number 425) | 19 | 19 | 19 | 19 |
| Ethylene diamine-PE (OH number 630) | 10 | 10 | 10 | 10 |
| Glycerol | 9 | 9 | 9 | 9 |
| Tris(chloroethyl) phosphate | 16 | 16 | 16 | 16 |
| Stabilizer | 1 | 1 | 1 | 1 |
| Ixol B 251 (OH number 339) | 16 | 16 | 16 | 16 |
| Water | 1 | 2.7 | 2.3 | 1 |
| R22 | — | — | 17 | — |
| R123 | — | — | — | 43 |
| R11 | 38 | 20 | — | — |
| Desmodur 44 V 40 | 150 | 174 | 172 | 150 |
| Start time (sec) | 6 | 8 | — | 7 |
| Gel time (sec) | 28 | 29 | 27 | 29 |
| Thickness of boards (mm) | 60 | 60 | 60 | 60 |
| Gross density (kg/m³) | 32 | 32 | 33 | 33 |
| Dimethylcyclohexylamine | 1.4 | 1.4 | 1.2 | 1.4 |

Example 22

The use of the polyols of the invention for the preparation of foams containing a higher proportion of isocyanurate structures may be carried out, for example, in accordance with the following formulation:

| | |
|---|---|
| 1% by weight | potassium acetate |
| 1.2% by weight | dimethylcyclohexylamine |
| 20% by weight | TDA—PE (e.g., from Example 1) |
| 31% by weight | sugar, propylene glycol, water-PO polyether (OH number 470) |
| 13% by weight | ethylenediamine-PO-polyether (OH number 630) |
| 7% by weight | cross-linking agent (OH number 1230) |
| 3% by weight | stabilizer |
| 26% by weight | tris(chloroethyl) phosphate |
| 56% by weight | R11 |
| 270% by weight | Desmodur 44 V 20 |

Reaction times:

Stirring time: 10 sec
Start time: 12 sec

```
        Gel time: 48 sec
Gross density of foam: 29 kg/m³
   Fire test (DIN 4102): B2
BVD test (Switzerland): Class V/3
```

What is claimed is:

1. A process for the preparation of a polyether polyol having an OH number of about 300 to about 630 comprising reacting, in the presence of an amine catalyst at a temperature of from about 90° to about 125° C., 2,4- and/or 2,6-tolylenediamine or a mixture of 2,4- and/or 2,6-tolylenediamine and one or more aromatic amines selected from o-tolylenediamine, diphenylmethane diamines or polyamines, and methyldiphenylmethane diamines or polyamines, with (a) from about 1 to about 2.5 moles of ethylene oxides for each mole of $NH_2$ groups and then with (b) from about 0.5 to about 5 moles of propylene oxide for each mole of $NH_2$ groups, such that the total quantity of ethylene oxide and propylene oxide is about 2.5 to about 5 moles per mole of $NH_2$ groups, wherein said polyether polyol contains secondary amino groups comprising from about 2 to about 20% of the total quantity of isocyanate-reactive groups in said polyol and has a free aromatic amine content of less than about 0.2% by weight of said polyol.

2. A process according to claim 1 wherein from 1.55 to 2.0 moles of ethylene oxide is used for each mole of $NH_2$ groups.

3. A process according to claim 1 wherein from 0.5 to 3.0 moles of propylene oxide is used for each mole of $NH_2$ groups.

4. A process according to claim 1 wherein the catalyst is an amine selected from N,N,N',N'-tetramethylguanidine, N-methylimidazole, benzyltrimethylammonium hydroxide or a corresponding homolog thereof, and 2-dialkylaminoethanol containing $C_1$-$C_4$ alkyl groups.

5. A polyether polyol which is prepared by the process of claim 1.

6. A polyether polyol according to claim 5 wherein from 1.55 to 2.0 moles of ethylene oxide is used for each mole of $NH_2$ groups.

7. A polyether polyol according to claim 5 wherein from 0.5 to 3.0 moles of propylene oxide is used for each mole of $NH_2$ groups.

* * * * *